United States Patent
Weider et al.

(10) Patent No.: US 11,537,941 B2
(45) Date of Patent: *Dec. 27, 2022

(54) REMOTE VALIDATION OF MACHINE-LEARNING MODELS FOR DATA IMBALANCE

(71) Applicant: MICROSOFT TECHNOLOGY LICENSING, LLC, Redmond, WA (US)

(72) Inventors: Christopher Lee Weider, Redmond, WA (US); Ruth Kikin-Gil, Bellevue, WA (US); Harsha Prasad Nori, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 439 days.

This patent is subject to a terminal disclaimer.

(21) Appl. No.: 16/424,253

(22) Filed: May 28, 2019

(65) Prior Publication Data

US 2020/0380398 A1 Dec. 3, 2020

(51) Int. Cl.
*G06N 20/00* (2019.01)
*G06F 16/28* (2019.01)

(52) U.S. Cl.
CPC ......... *G06N 20/00* (2019.01); *G06F 16/285* (2019.01)

(58) Field of Classification Search
CPC .............................. G06N 20/00; G06F 16/285
See application file for complete search history.

(56) References Cited

U.S. PATENT DOCUMENTS

| | | |
|---|---|---|
| 5,862,325 A | 1/1999 | Reed et al. |
| 7,318,051 B2 | 1/2008 | Weston et al. |
| 8,260,810 B2 | 9/2012 | Hisanaga et al. |
| 8,412,651 B2 | 4/2013 | Paiva et al. |
| 8,473,519 B1 | 6/2013 | Siddiqui et al. |
| 9,838,407 B1 | 12/2017 | Oprea et al. |
| 9,916,540 B2 | 3/2018 | Shoaib et al. |
| 9,984,219 B2 | 5/2018 | Chaar et al. |

(Continued)

FOREIGN PATENT DOCUMENTS

| | | |
|---|---|---|
| EP | 3483797 A1 | 5/2019 |
| WO | 32095534 A2 | 11/2002 |
| WO | 2020055580 A1 | 3/2020 |

OTHER PUBLICATIONS

Grier, 2005.*

(Continued)

*Primary Examiner* — Michael I Ezewoko
(74) *Attorney, Agent, or Firm* — NovoTechIP International PLLC

(57) ABSTRACT

A method and system for providing data imbalance detection and validation for a trained a ML model includes receiving a request to perform data imbalance detection on the trained ML model, identifying a feature of a dataset associated with the trained model for which data imbalance detection is to be performed, receiving access to the dataset, receiving access to the trained ML model, examining at least one of the dataset or outcome data generated by the trained ML model to determine a distribution of the feature or a distribution of the outcome data, and determining if the trained ML model exhibits data imbalance based at least in part on the distribution of the feature or the distribution of the outcome data.

9 Claims, 13 Drawing Sheets

(56) References Cited

U.S. PATENT DOCUMENTS

| | | | |
|---|---|---|---|
| 10,354,205 | B1 | 7/2019 | Pham et al. |
| 10,401,275 | B2 | 9/2019 | Kavsek et al. |
| 10,546,232 | B2 | 1/2020 | Guo et al. |
| 10,861,028 | B2* | 12/2020 | Silberman .............. G06N 5/025 |
| 10,990,901 | B2* | 4/2021 | Deo ....................... G06N 20/20 |
| 11,062,792 | B2 | 7/2021 | Grouchy et al. |
| 11,256,959 | B2 | 2/2022 | Iyer et al. |
| 11,327,655 | B2 | 5/2022 | Kirkpatrick |
| 11,327,675 | B2 | 5/2022 | Swamy et al. |
| 11,327,992 | B1 | 5/2022 | Batsakis et al. |
| 2013/0097103 | A1 | 4/2013 | Chari et al. |
| 2015/0088791 | A1 | 3/2015 | Lin et al. |
| 2017/0270429 | A1 | 9/2017 | Bhattacharya et al. |
| 2017/0330058 | A1 | 11/2017 | Silberman et al. |
| 2019/0147371 | A1 | 5/2019 | Deo et al. |
| 2019/0228006 | A1* | 7/2019 | Tormasov .............. H04L 9/3239 |
| 2020/0081865 | A1* | 3/2020 | Farrar ................... G06K 9/6218 |
| 2020/0167653 | A1* | 5/2020 | Manjunath ............. G06N 7/005 |
| 2020/0184423 | A1 | 6/2020 | Mcenroe et al. |
| 2020/0226489 | A1 | 7/2020 | Li et al. |
| 2020/0285898 | A1 | 9/2020 | Dong |
| 2020/0302524 | A1* | 9/2020 | Kamkar ................. G06N 3/084 |
| 2020/0380309 | A1 | 12/2020 | Weider et al. |
| 2020/0380310 | A1 | 12/2020 | Weider et al. |
| 2020/0380399 | A1 | 12/2020 | Weider et al. |

OTHER PUBLICATIONS

Edelman, 2008.*
Wirth, 1976.*
Dam, 2013.*
Goffman, 1974.*
Kuhn, 1962.*
Hayles, 2005_.*
Lakoff, 1980.*
Mindell, 2015_.*
Treffert, 2010.*
Chung, 2018.*
Adebayo, 2016.*
Cabrera, Apr. 2019 (Angel Alexander Cabrera, Will Epperson, Fred Hohman, Minsuk Kahng, Jamie Morgenstern, Duen Horng Chau: FairVis: Visual Analytics for Discovering Intersectional Bias in Machine Learning. arXiv preprint (Apr. 2019). arXiv: 1904.05419 or or arXiv:1904.05419v1).*
Bionformatics, The Machine Learning Approach, Baldi, MIT Press, 1999, pp. xi-5.*
Counterfactual-Explanations-Wachter, Harvard Journal of Law & Technology, 2018, pp. 841-887.*
Fairness and Abstraction in Sociotechnical Systems, Selbst, Association for Computing Machinery. 2019, pp. 59-68.*
Mind Over Machine, Drefus, Macmillan, 1986, pp. 1-66.*
Practical Wisdom, Schwartz, Penguim, 2010, pp. 81-154.*
The Hidden Biases in Big Data, Kate Crawford, Harvard Business Review 2013, pp. 1-5.*
What Computers Can't Do, Dreyfus, Harper & Row, 1972, pp. 75-117.*
Automated Data Slicing for Model Interpretability, Chung, Association for Computing Machinery, 2018, sections 1-4.*
Intersectional Accuracy Disparities in Commercial Gender Classification, Buolamwini, Proceedings of Machine Learning Research 81, 2018, pp. 1-15.*
Adebayo, Julius A., "FairML : ToolBox for Diagnosing Bias in Predictive Modeling", In thesis Submitted to the Institute for Data, Systems, and Society & Department of Electrical Engineering and Computer Science, Massachusetts Institute of Technology, Jun. 2016, 99 Pages.
"International Search Report and Written Opinion Issued in PCT Application No. PCT/US2020/028385", dated Jul. 22, 2020, 9 Pages.
"Fairness: Identifying Bias", Retrieved From: https://developers.google.com/machine-learning/crash-course/fairness/identifying-bias?, Apr. 18, 2019, 6 Pages.
"Pre-interview First Office Action Issued in U.S. Appl. No. 16/424,314", dated Sep. 9, 2021, 11 Pages.
"Notice of Allowance Issued in U.S. Appl. No. 16/424,314", dated Mar. 17, 2022, 23 Pages.
Fernandez, et al., "Learning from Imbalanced Data Sets", In the Book of Springer International Publishing, 2018, 385 Pages.
Friedler, et al., "On the (im)possibility of fairness", In Repository of arXiv:1609.07236v1, Sep. 23, 2016, pp. 1-16.
Kleinberg, et al., "Inherent Trade-Offs in the Fair Determination of Risk Scores", In Proceedings of 8th Innovations in Theoretical Computer Science, Jan. 9, 2017, 23 Pages.
Kraska, Tim, "Northstar: An Interactive Data Science System", In Proceedings of the VLDB Endowment, vol. 11, Issue 12, Aug. 1, 2018, pp. 2150-2164.
Li, et al., "REPAIR: Removing Representation Bias by Dataset Resampling", https://arxiv.org/abs/1904.07911, Apr. 16, 2019, 10 Pages.
"International Search Report and Written Opinion Issued in PCT Application No. PCT/US2020/029034", dated Aug. 3, 2020, 12 Pages.
Wexler, et al., "Google AI Blog: Facets: An Open Source Visualization Tool for Machine Learning Training Data", Retrieved from: https://ai.googleblog.com/2017/07/facets-open-source-visualization-tool.html, Jul. 17, 2017, 6 Pages.
Wickham, Hadley, "Tidy Data", In Journal of Statistical Software vol. 59, Issue 10, Aug. 2014, 23 Pages.
"Notice of Allowance Issued in U.S. Appl. No. 16/424,314", dated Apr. 28, 2022, 17 Pages.
Zadrozny, Bianca, "Learning and Evaluating Classifiers under Sample Selection Bias", In Proceedings of the Twenty-First International Conference on Machine Learning, Jul. 4, 2004, 8 Pages.
"Final Office Action Issued in U.S. Appl. No. 16/424,371", dated Oct. 27, 2021, 25 Pages.
"First Action Interview Office Action Issued in U.S. Appl. No. 16/424,371", dated May 27, 2021, 5 Pages.
"Non Final Office Action Issued in U.S. Appl. No. 16/424,371", dated Apr. 20, 2022, 20 Pages.
"Preinterview First Office Action Issued in U.S. Appl. No. 16/424,371", dated Feb. 8, 2021, 5 Pages.
"Notice of Allowance Issued in U.S. Appl. No. 16/424,412", dated May 19, 2022, 9 Pages.
Batista, et al., "A Study of the Behavior of Several Methods for Balancing Machine Learning Training Data", In Journal of ACM SIGKDD Explorations, vol. 6, Issue 1, Jun. 1, 2004, pp. 20-29.
Kamiran, et al., "Data Preprocessing Techniques for Classification without Discrimination", In Journal of Knowledge and Information Systems, vol. 33, Issue 1, Oct. 1, 2012, 33 Pages.
"International Search Report and Written Opinion Issued in PCT Application No. PCT/US20/028904", dated Aug. 4, 2020, 11 Pages.
"International Search Report and Written Opinion Issued in PCT Application No. PCT/US20/028905", dated Jul. 24, 2020, 11 Pages.
"Notice of Allowance Issued in U.S. Appl. No. 16/424,314", dated Jun. 20, 2022, 3 Pages.
"Notice of Allowance Issued in U.S. Appl. No. 16/424,412", dated Aug. 15, 2022, 7 Pages.
US20200380399A1, filed Dec. 3, 2020.
US20200380309A1, filed Dec. 3, 2020.
US-2020-0380310-A1, filed Dec. 3, 2020.
"Office Action Issued in European Patent Application No. 20725011.9", dated Aug. 18, 2022, 6 Pages.
"Notice of Allowance Issued in U.S. Appl. No. 16/424,314", dated Aug. 24, 2022, 12 Pages.
"Final Office Action Issued in U.S. Appl. No. 16/424,371", dated Aug. 23, 2022, 27 Pages.
Chouldechova, et al.,"The Frontiers of Fairness in Machine Learning", In repository of arXiv: 1810.08810v1, Oct. 20, 2018, pp. 1-13.
Cortes, et al., "Sample Selection Bias Correction Theory", In Proceedings of the International Conference on Algorithmic Learning Theory, Oct. 13, 2008, 16 Pages.

(56) References Cited

OTHER PUBLICATIONS

Webster, Merriam, Definintion of "Mitigate", Retrieved from: https://web.archive.org/web/20190329114351/https://www.merriam-webster.com/dictionary/mitigate, Mar. 19, 2019, 12 Pages.

Webster, Merriam, Definition of "Bayesian", Retrieved from: https://web.archive.org/web/20181228121014/https://www.merriam-webster.com/dictionary/Bayesian, Dec. 28, 2018, 8 Pages.

\* cited by examiner

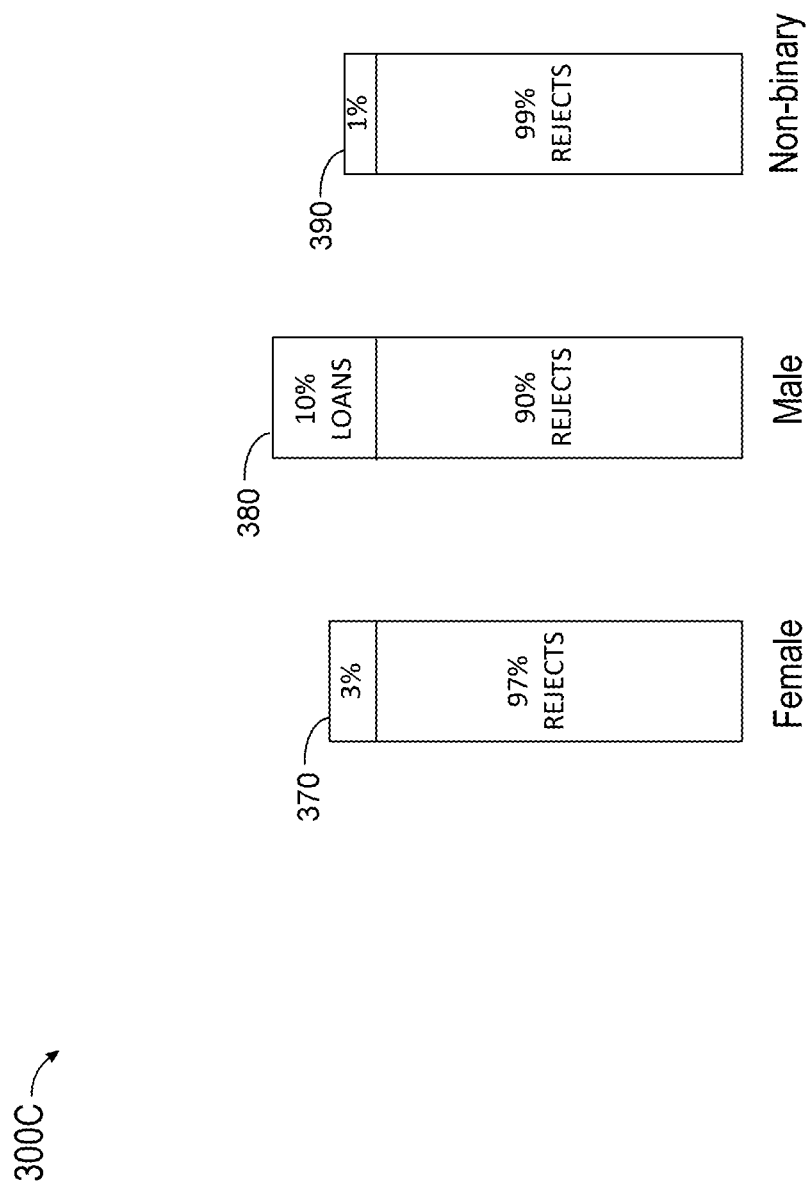

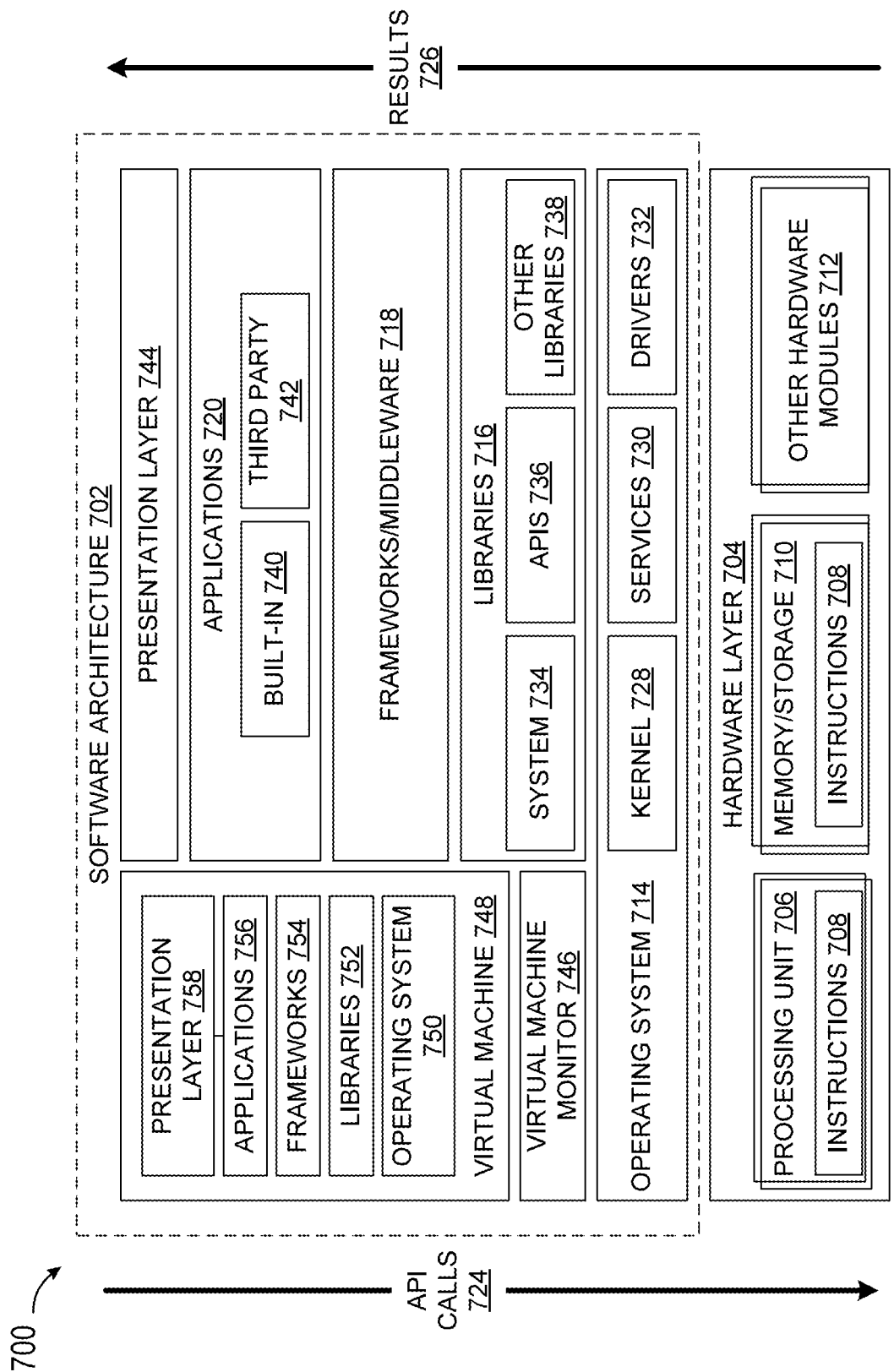

REMOTE VALIDATION OF MACHINE-LEARNING MODELS FOR DATA IMBALANCE

CROSS-REFERENCE TO A RELATED APPLICATION

This patent application is related to co-pending, commonly-owned U.S. patent application Ser. No. (not yet assigned) entitled "Method and System of Detecting Data Imbalance in a Dataset Used in Machine-Learning," filed concurrently herewith under; U.S. patent application Ser. No. (not yet assigned) entitled "Method and System of Correcting Data Imbalance in a Dataset Used in Machine-Learning," filed concurrently herewith under; and U.S. patent application Ser. No. (not yet assigned) entitled "Method and System of Performing Bias Data Imbalance Detection and Correction in Training a Machine-Learning Model," filed concurrently herewith under, which are all incorporated herein by reference in their entirety.

BACKGROUND

In recent years, machine learning techniques are increasingly used in training machine learning models that provide functionalities in everyday life. These functionalities may have consumer related applications or may be used by institutions and organizations in automating decisions that were traditionally made by humans. For example, banks may use machine learning models to determine loan approvals, credit scoring or interest rates. Other institutions may utilize machine learning models to make hiring decisions, salary and bonus determinations and the like. Machine learning models may be used in making decisions in many other instances that have significant implications in people's lives. These machine learning models are often trained using large datasets that are collected in a variety of different manners by people or institutions. For example, researchers conducting research or organizations that are in the business of collecting data are some of the entities that may provide datasets for training machine leaning models.

The process of collecting data, however, often introduces bias in the dataset. For example, most datasets are skewed heavily towards a certain type of demographic. This may be because of bias in the way data is collected by the data collector or simply because data relating to certain demographics are more readily available. Regardless of how bias is introduced in a dataset, the results can be harmful. For example, if the dataset does not include as many female datapoints as male datapoints, the machine leaning model trained based on this dataset may produce results that are more favorable to males. When machine learning models are used to make important decisions, such biases can have significant implications for people.

Hence, there is a need for improved systems and methods of determining if a trained model exhibits bias.

SUMMARY

In one general aspect, this disclosure presents a device having a processor and a memory in communication with the processor wherein the memory stores executable instructions that, when executed by the processor, cause the device to perform multiple functions. The function may include receiving a request to perform data imbalance detection on the trained ML model, identifying a feature of a dataset associated with the trained model for which data imbalance detection is to be performed, receiving access to the dataset, receiving access to the trained ML model, examining at least one of the dataset or outcome data generated by the trained ML model to determine a distribution of the feature or a distribution of the outcome data, and determining if the trained ML model exhibits data imbalance based at least in part on the distribution of the feature or the distribution of the outcome data.

In yet another general aspect, the instant application describes a method for providing data imbalance detection and validation for a trained a ML model. The method may include the steps of receiving a request to perform data imbalance detection on the trained ML model, identifying a feature of a dataset associated with the trained model for which data imbalance detection is to be performed, receiving access to the dataset, receiving access to the trained ML model, examining at least one of the dataset or outcome data generated by the trained ML model to determine a distribution of the feature or a distribution of the outcome data, and determining if the trained ML model exhibits data imbalance based at least in part on the distribution of the feature or the distribution of the outcome data.

In a further general aspect, the instant application describes a non-transitory computer readable medium on which are stored instructions that when executed cause a programmable device to receive a request to perform data imbalance detection on the trained ML model, identify a feature of a dataset associated with the trained model for which data imbalance detection is to be performed, receive access to the dataset, receiving access to the trained ML model, examine at least one of the dataset or outcome data generated by the trained ML model to determine a distribution of the feature or a distribution of the outcome data, and determine if the trained ML model exhibits data imbalance based at least in part on the distribution of the feature or the distribution of the outcome data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 3A-3C depict example bar charts for displaying distribution in data.

FIG. 7 is a block diagram illustrating an example software architecture, various portions of which may be used in conjunction with various hardware architectures herein described.

DETAILED DESCRIPTION

Figure 1:
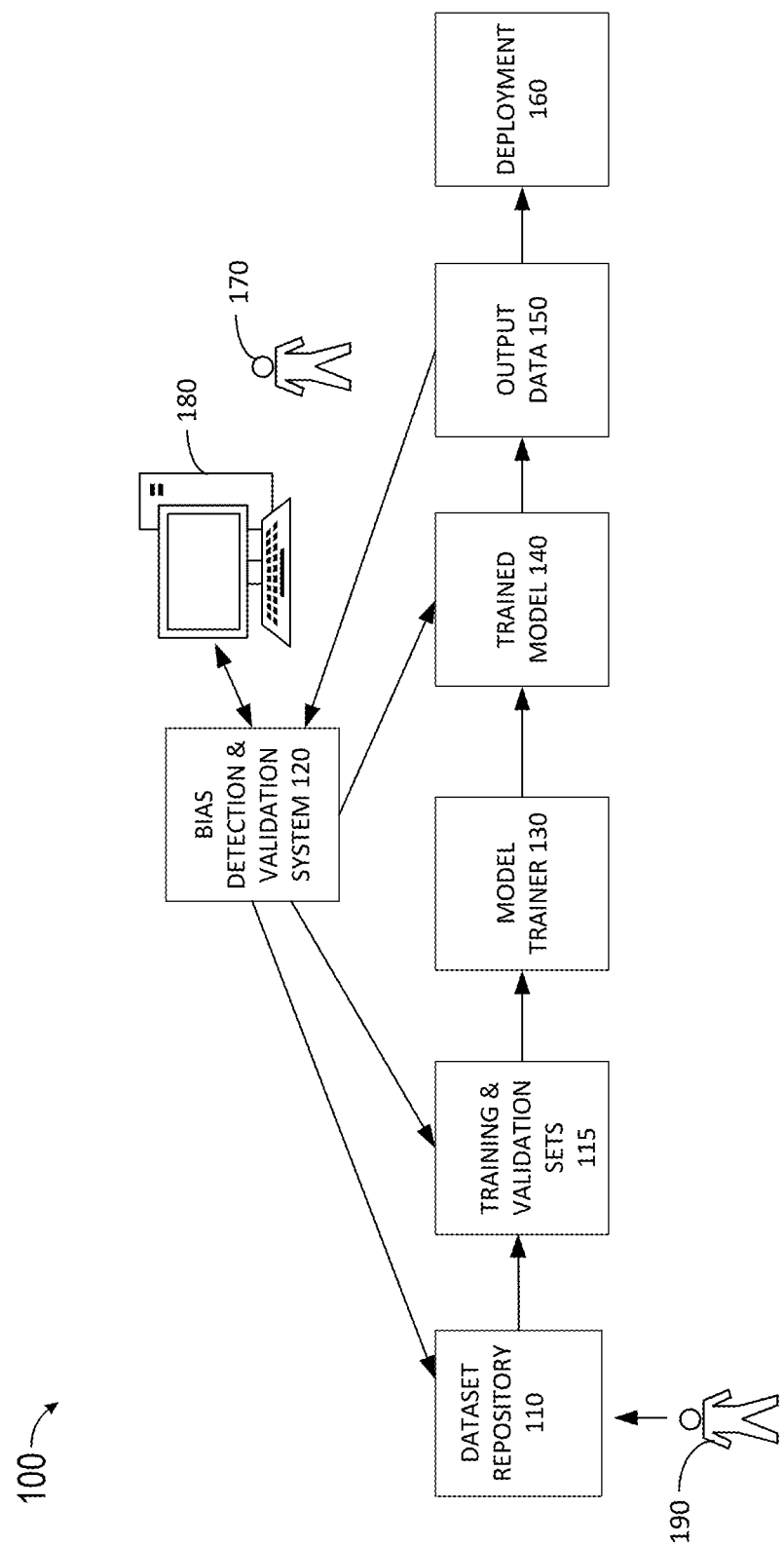
FIG. 1 depicts a simplified example system architecture for detecting and addressing bias in machine learning operations.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Large datasets are increasingly used in order to train machine learning models that provide a variety of functionalities. With the significant increase in use of machine learning models in business and personal arenas to automate decision making functions, the contents of such large datasets can significantly affect different aspects of peoples' everyday lives. As a result, undetected bias in a dataset used for training a machine learning model can have significant negative implications on people or institutions the dataset was biased against. For example, if a dataset has a substantially larger number of datapoints for a particular population, the training performed based on such a dataset may heavily skew the trained model in favor of that particular population. This can introduce undesired and at times unknown discrimination against certain populations in the way the trained model makes decisions. Furthermore, a biased dataset an/or one that includes imbalanced data may result in a model that produces incorrect results. For example, if a dataset has one or more features that have missing values for a large number of datapoints, it may be difficult to correlate those features with accurate outcomes. Thus, data imbalance may include biased data or data that otherwise contains some imbalance that may cause inaccuracies in outcome.

As more trained models begin making important decisions, it becomes more and more important to ensure that these models satisfy certain ethical, regulatory and policy legal, requirements. However, because discrimination and bias are often subjective, it may not be easy for a developer to determine if a given dataset or trained model exhibits bias. For example, imbalanced distributions may be seen as part of the design of the model in order to enable it to predict more accurate results. For example, a loan approval machine-learning (ML) model that approves only 3% of female applicants as opposed to 10% of male applicants, may not be seen as biased by one developer if the outcome accurately mirrors predicted default rates. Another developer viewing the same imbalanced distribution may decide that such a result is biased even if it accurately mirrors predicted default rates. Thus, different developers and organizations may use different standards to decide whether bias exists in a dataset and how it should be addressed. This may result in significant ethical and/or legal challenges across various organizations as they attempt to ensure their models comply with ethical, regulatory and policy issues.

To address these issues and more, in an example, this description provides a third-party remote data imbalance detection and validation service for machine learning models. In an example, a third-party remote data imbalance detection and validation service may be provided to model creators to provide an objective and standardized manner in which bias can be detected in a variety of trained models. Bias may be detected by the data imbalance detection and validation service by identifying one or more features of the dataset that can introduce bias, determining the classifications with which each feature can be categorized and statistically examining those features to determine if they provide a balanced distribution across the different categories. For example, a database that includes gender as a feature may be examined to determine if the dataset provides a balance distribution across the male, female and non-binary categories with which gender can be categorized. The resulting distribution may then be reported to and analyzed by a user of the data imbalance detection and validation service to determine if the model is unbiased based on a standard set of parameters. The remote data imbalance detection and validation service may also be used to detect inaccuracies caused by imbalance in the datasets used to train a ML model. As a result, the solution provides a method of easily and efficiently providing objective analysis of trained ML models to determine if they can be validated for being low-biased or unbiased, and/or determined to be void of data imbalance.

As will be understood by persons of skill in the art upon reading this disclosure, benefits and advantages provided by such implementations can include, but are not limited to, a solution to the technical problems of inconsistent and inaccurate identification of bias in trained machine learning models. Technical solutions and implementations provided here optimize the process of detecting bias and/or imbalanced data in trained machine learning models by providing a third-party data imbalance detection and validation service that can remotely validate a trained model. The benefits provided by these solutions provide increased accuracy, fairness and consistency across machine learning models and ensure that machine learning models comply with ethical and legal standards.

As a general matter, the methods and systems described herein may relate to, or otherwise make use of, machine-trained models. Machine learning generally involves various algorithms that can automatically learn over time. The foundation of these algorithms is generally built on mathematics and statistics that can be employed to predict events, classify entities, diagnose problems, and model function approximations. As an example, a system can be trained in order to identify patterns in user activity, determine associations between various datapoints and make decisions based on the patterns and associations. Such determination may be made following the accumulation, review, and/or analysis of data from a large number of users over time, that may be configured to provide the ML algorithm (MLA) with an initial or ongoing training set.

In different implementations, a training system may be used that includes an initial ML model (which may be referred to as an "ML model trainer") configured to generate a subsequent trained ML model from training data obtained from a training data repository. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network.

Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

FIG. 1 illustrates system architecture 100 for providing a bias detection and validation service for ML models. The system 100 may include a dataset repository 110 which includes one or more datasets for training a ML model. Each dataset may include a significant number of queries. In an example the datasets may include tens of thousands of queries. The datasets may be provided by one or more organizations. For example, organizations that collect consumer data as part of their applications may provide data collected by the applications for training ML models. In another example, a dataset may be provided by a researcher conducting research on a population or a scientific subject. For example, health related data may be provided by researches that conduct research in the medical and health fields and provide their findings in a dataset. Other types of data collection may be employed. For example, polling data may be collected and provided by pollsters, or data relating to specific outcomes may be collected and provided by organizations that wish to use the outcomes to train models that predict more desirable outcomes. For example, banks may collect data on loan defaults and circumstances that lead to defaults to train a ML model that determines if a person qualifies for a loan. In another example, non-human data may be collected and provided by organizations that work in a field. For example, temperature readings from a large set of automated sensors may be collected in a dataset and used to train a ML model for predicting conditions that correspond with temperature changes. In one implementation, the training datasets may be continually updated as more data becomes available. It should be noted that the dataset can include tabular and non-tabular data. For example, datasets including image or voice data may be used to train facial recognition or voice recognition ML models. The dataset repository 110 may be stored in a cloud environment or one or more local computers or servers.

To comply with privacy and security regulations and ethical guidelines the datasets may be anonymized and generalized to ensure they do not expose a person's private information. However, even if a dataset does include some private information, the bias detection and validation system 120 may only retain facets of the data that are anonymized and generalized as a distribution curve such that there is no connection between the final results and any specific data point that contributed to it.

Once a dataset is ready to be used in training a ML model, then the dataset may be divided into training and validation sets 115. That is because when a model is trained on a certain set of data, the data may be split into a training subset and a validation subset. This is to determine whether the model is accurately processing data it has not seen before. The process may involve training the model on the training subset of data, and then providing the trained model the validation subset of data as input to determine how accurately the model predicts and classifies the validation data. The predictions and classifications may then be compared to the labels already determined by the validation dataset to determine their accuracy Once the subsets have been prepared, the dataset 110 may be used by a model trainer 130 to train a trained model 140. The model trainer 130 can be any supervised or unsupervised machine learning training mechanism known in the art and used for training ML models. After the training process is complete, then the trained model 140 may be used to generate output data 150, which may then be used to validate the trained model before it may be deployed for use in the real-world via deployment mechanism 160.

In one implementation, to provide data imbalance detection and validation, the dataset used in the dataset repository 110 may be provided to the bias detection and validation system 120 in addition to an access point to the trained model. The bias detection and validation system 120 may then examine the dataset and the output data to determine if any undesired bias exists in the dataset or is generated by the output data or if inaccuracies exists in the output data. The bias detection and validation system 120 may be provided as a service that can access and statistically examine a dataset to identify data imbalance. The bias detection system 120 may be accessible via a computer client device 180 by enabling a user 170 to provide input, execute a data imbalance detection operation and/or view the results of the data imbalance detection operation via one or more user interfaces. The user 170 may be a person(s) responsible for managing data imbalance detection and validation services and may be associated with a third-party organization that provides data imbalance detection and validation services and/or certifications.

The data imbalance detection and validation services may be used to detect bias in the original dataset in addition to identifying bias in other subsets of data, such as training and validation subsets used to train a model. That is because while many techniques for splitting the data set into training and validation datasets make an attempt to provide a good distribution of data in both datasets, the techniques do not check for or ensure that no bias and/or data imbalance is introduced during the splitting process.

The bias detection and validation system 120 may also be used to detect bias and/or inaccuracies in the outcome of the trained model. That is because, even with unbiased input data, a model may be trained to deliver biases in outcome. For example, even if the input dataset includes an equal number of men and women, a trained model may rate more men than women good credit risks because of hidden associations in the data, because of a label imbalance (e.g., more men in the input dataset are labeled as good risks even though overall there are just as many good risks as bad risks in the input data), or because the validation dataset having a different distribution in key features than the training dataset. Thus, even if the input dataset is examined and approved as unbiased, it may be important to examine the outcome data to ensure that the outcome is also unbiased or low-biased. As a result, the output data 150 may be provided to the bias detection and validation system 120 to identify bias in the outcome. Alternatively, the bias detection and validation system 120 may execute the trained model with either a subset of the input data or a validation dataset to determine if the outcome obtained is biased. The results of the bias detection procedure may be reported to a user 190 associated with the trained model. The results may include information about the types of bias identified in the dataset or types of bias and inaccuracies detected in the outcome to enable the user 190 to determine how to correct the bias and/or inaccuracy. If the model is determined to be unbiased or low-biased within a threshold of desired distribution, then a certification may be provided recognizing the trained model as unbiased or low-biased.

In one implementation, once a certification is granted, periodic examination may be performed to ensure that ML model still complies with the standards set by the imbalance data detection and validation service. This is because changes in data and consequently the trained ML model may occur periodically which may affect the outcome of the model. The periodic examinations may occur automatically or may be initiated by the user 170 or the user 190.

Figure 2:
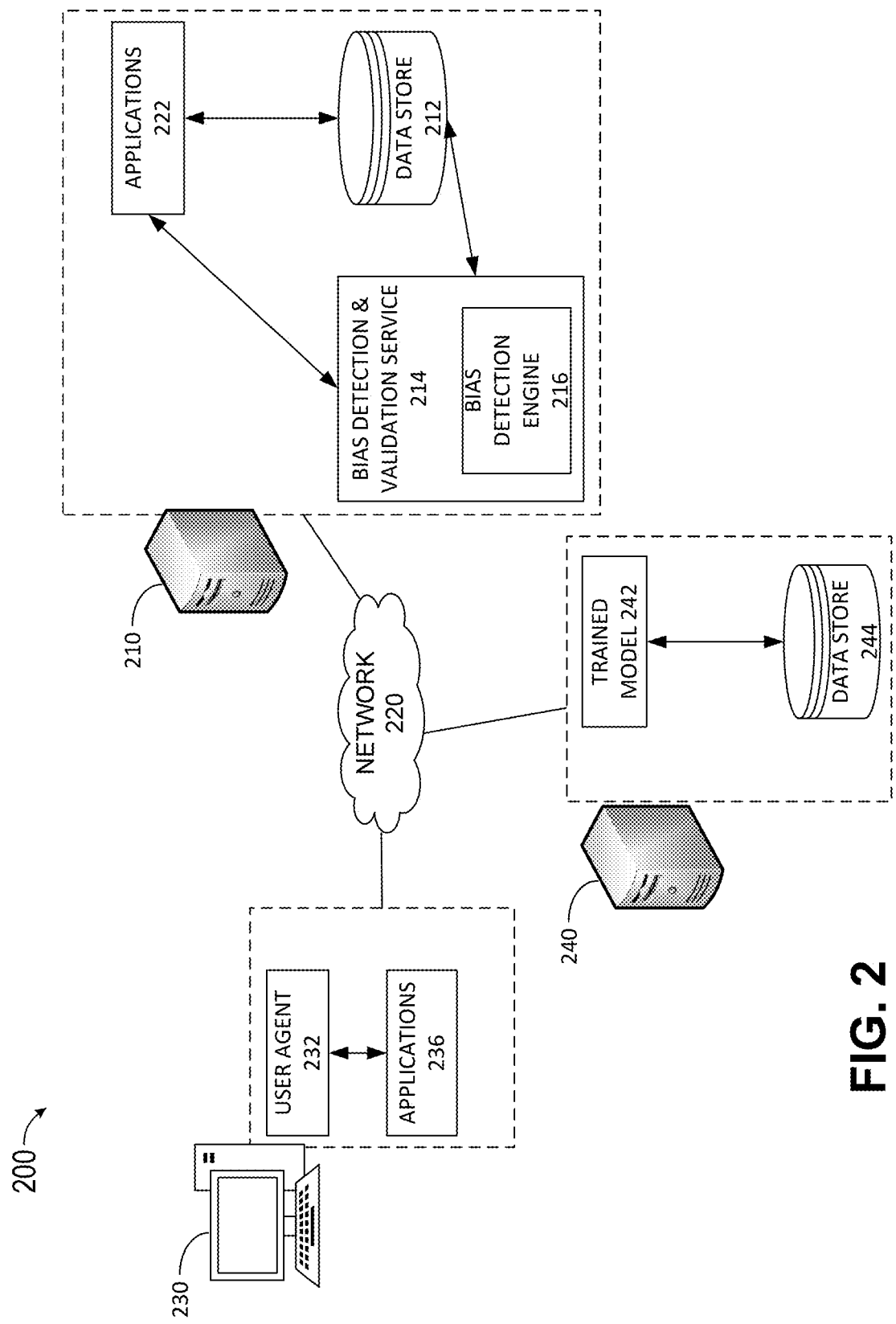
FIG. 2 depicts an example environment upon which aspects of this disclosure may be implemented.

FIG. 2 illustrates an example environment 200 upon which aspects of this disclosure may be implemented. The environment 200 may include a server 210 which may be connected to or include a data store 212 that may function as a repository in which datasets used for training ML models may be stored. The server 210 may operate as a shared resource server located at an enterprise accessible by various computer client devices such as client device 230. The server may also operate as a cloud-based server for bias detection and validation services.

The server 210 may include and/or execute a bias detection and validation service 214 which may provide intelligent third-party bias detection and validation. The bias detection and validation service 214 may operate to access a server 240 which may include a trained model 242 for performing bias detection and validation on the trained model 242. The server 240 may include a data store 244 which may store the datasets used for training and validating the trained model 242. Access to the data store 244 may also be provided to the detection and validation service 214 via the network 220. Alternatively, a copy of the datasets may be transmitted to the detection and validation service 214. In one implementation, the process of bias detection and validation in a dataset is performed by a bias detection engine 216.

The client device 230 may be connected to the server 210 via the network 220. The network 220 may be a wired or wireless network(s) or a combination of wired and wireless networks that connect one or more elements of the environment 200. The client device 230 may be a personal or handheld computing device having or being connected to input/output elements that enable a user to interact with various applications (e.g., applications 222 or applications 236) and services. Examples of suitable client devices 230 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail in regard to FIGS. 7 and 8. It should be noted that client device 230 is representative of one example client device for simplicity. Many more client devices may exist in real-world environments.

The client device 230 may include one or more applications 236. Each application 236 may be a computer program executed on the client device that configures the device to be responsive to user input to allow a user to interact with a dataset or allow a user to view reports.

In some examples, applications used for processing, collecting or editing data or viewing reports may be executed on the server 210 (e.g., applications 222) and be provided via an online service. In one implementation, web applications (such as applications 222 and bias detection and validation service 214) may communicate via the network 220 with a user agent 232, such as a browser, executing on the client device 230. The user agent 232 may provide a user interface that allows the user to interact with the detection and validation service 214 and may enable the detection and validation service 214 to provide bias detection as part of the web service.

Figure 3A:
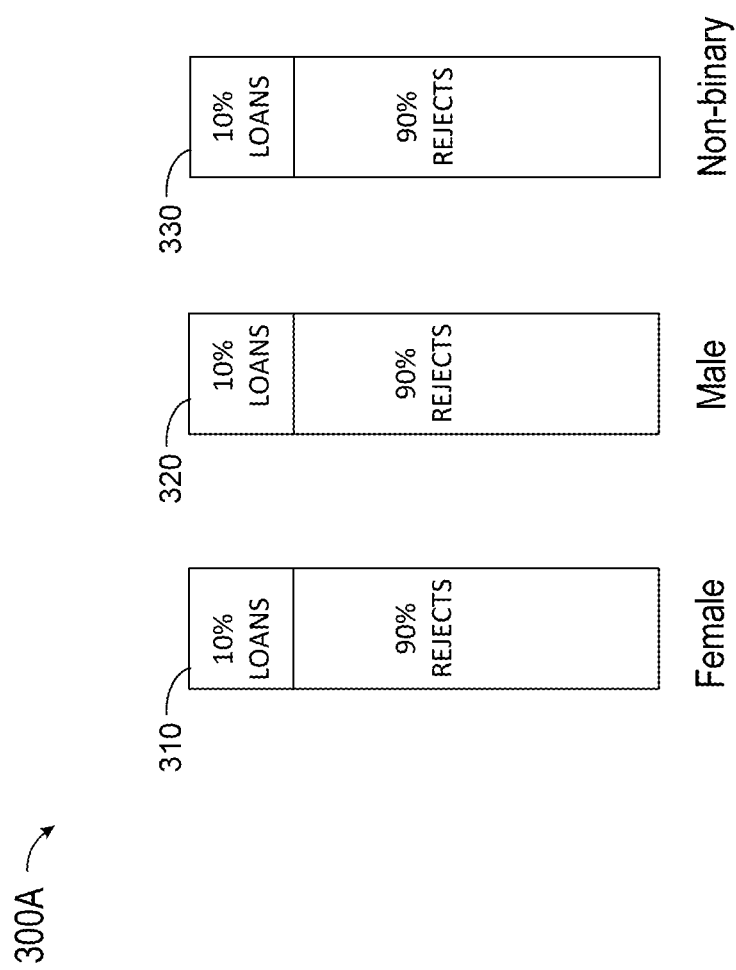
Figure 3B:
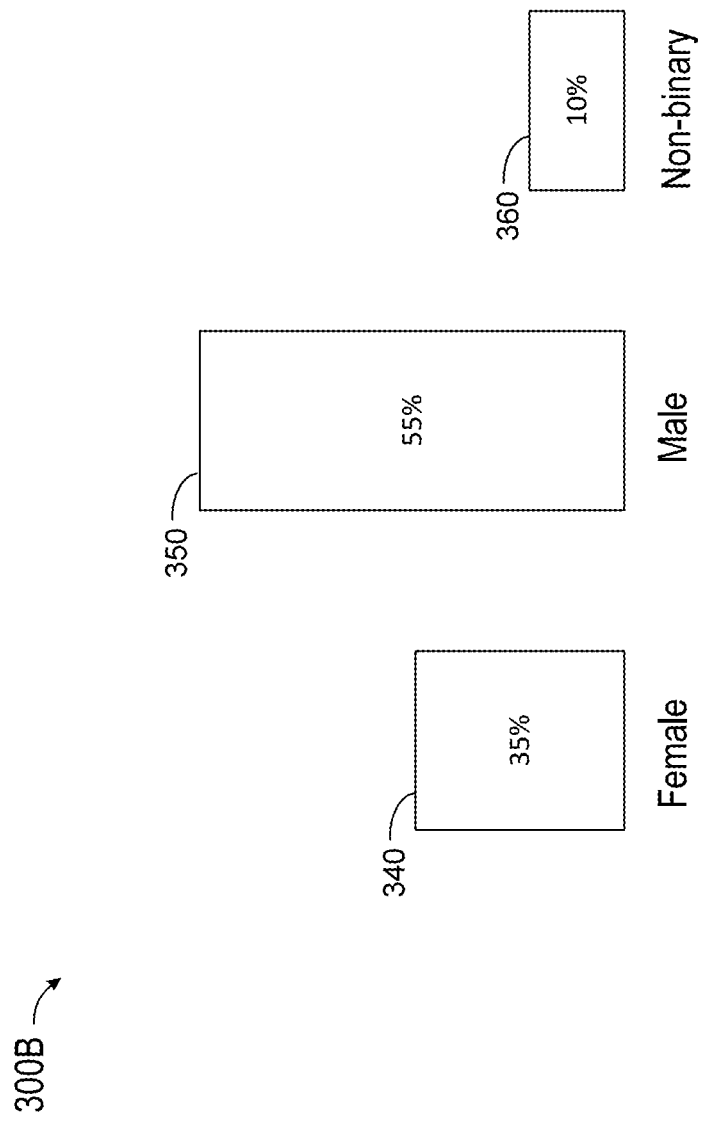

FIGS. 3A-3B depict example bar charts for displaying distribution in data to show how bias can be present in a dataset and affect outcome of a model. FIG. 3A displays a bar chart 300A that depicts an ideal distribution of data in a dataset based on a gender attribute of the dataset. This assumes that one of the attributes of a datapoint in the dataset is gender and gender is categorized by the female, male and non-binary categories. The example also assumes that the dataset is used to train a model for determining loan approvals. For such a dataset, an idea distribution based on gender would result in a female bar 310 that has an equal distribution to the male bar 320 and the non-binary bar 330. This means the number of data entries that represent each of the categories of the gender attribute is equal or within a predetermined distribution threshold. As a result, the percentage of loans approved for people falling into each category may be equal. Thus, the model trained by this dataset generates outcomes that are consistent across the gender spectrum (e.g. 10% of loans submitted by applicants in each category are approved).

The ideal distribution depicted in FIG. 3A, however, rarely occurs in the real world. Often the dataset is representative of one category more than others. FIG. 3B depicts a bar chart 300B displaying a more realistic distribution of data across the gender spectrum in a dataset. The bar chart 300B shows the female bar 340 represents 35% of the data, while the male bar 350 represents 55% of the data and the non-binary bar chart 360 represents only 10% of data. This shows a clear imbalanced distribution of data across the three categories. When such an imbalanced dataset is used to train a ML mode, the outcome is often severely biased. FIG. 3C depicts a bar chart 300C displaying such an outcome. The female bar 370 of bar chart 300C shows that the ML model rejects 97% of female applicants, while the male bar 380 displays only 3% of the male applicants are rejected by the ML model. As the non-binary bar 390 shows, the percentage of people falling into the non-binary category that are rejected is even higher than the female applicants with a 99% rejection rate. As such, imbalanced or biased distribution of input data in a dataset can significantly impact the outcome produced be a ML model trained with the imbalanced dataset.

Figure 4A:
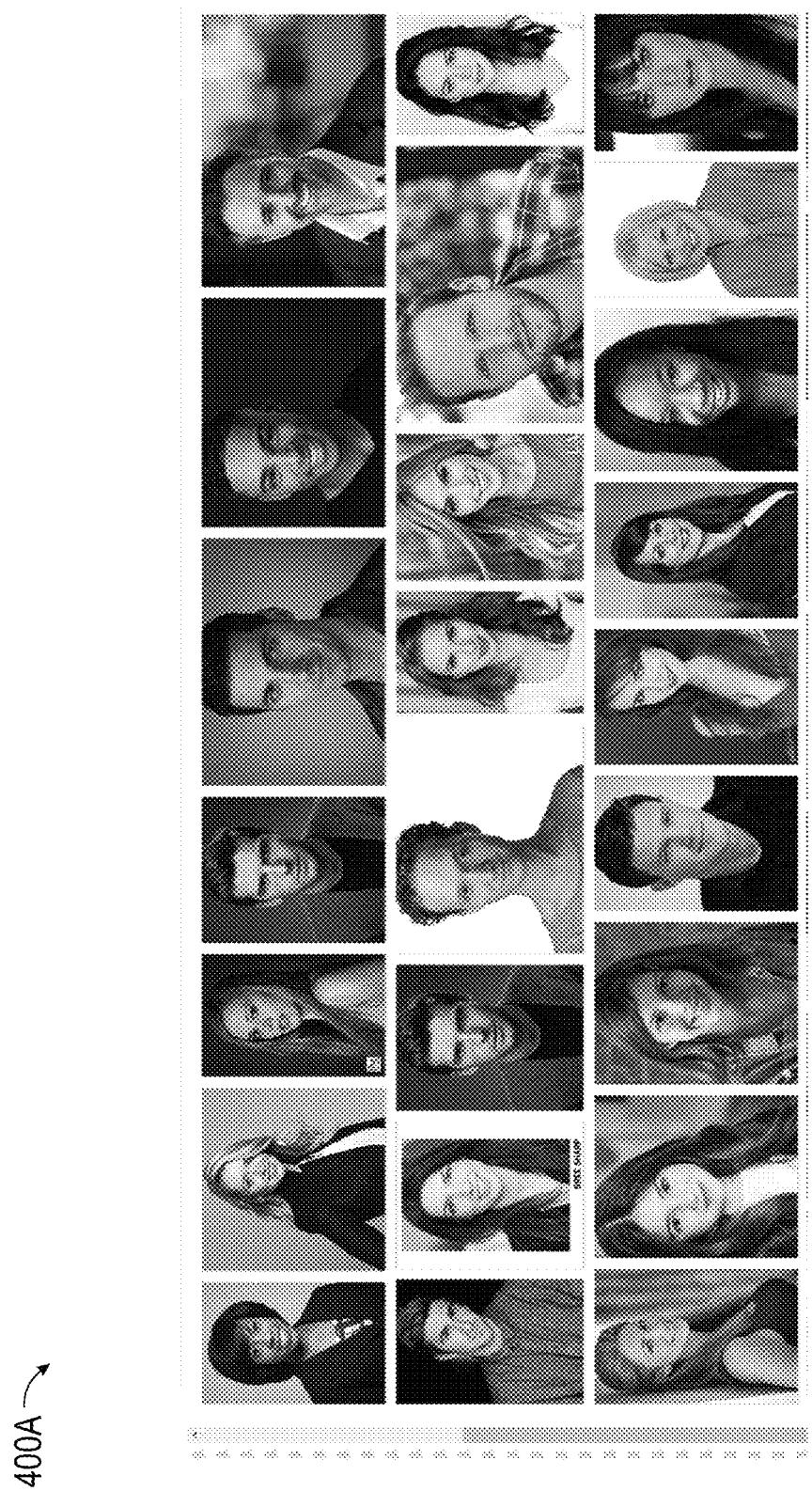
FIG. 4A is an example dataset that can be used to train an example machine learning model.

FIG. 4A depicts an example non-tabular dataset 400A that can be used as input data to train a ML model. The dataset 400A includes images depicting faces of a variety of individuals having different ages, genders, and races. In one implementation, the dataset 400A may be used to train a facial recognition ML model. In order to ensure that the trained model correctly recognizes faces of people having different ages, skin tones and genders, a dataset which provides a balanced distribution of those features may be needed. However, it may be very difficult to determine if the dataset includes a balanced distribution by simply examining the contents of the dataset. This may be particularly true for datasets that include a significant number of datapoints. The bias detection and validation system, however, can make the determination quickly and efficiently. For example, bias detection may be initiated by a user by pressing on a menu button on a user interface of the bias detection and validation application or service. The user interface may enable a user of the bias detection and validation application or service to initiate bias detection by selecting the dataset on which bias detection should be performed. As discussed above, the dataset may be provided to the bias detection and validation application or service by the model creator/developer. Subsequently, the user may be prompted to enter a feature of the dataset for which bias should be checked. For example, for the dataset 400A, the user may select skin tone as the feature for which bias and/or imbalanced in data is examined. The feature may be identified to the user the model creator/developer or may be determined by the user of by the bias detection and validation application or service based on features of the dataset and knowledge of common features for which bias may be present. Alternatively. The bias detection and validation application or service may itself identify features of the dataset for which bias should be examined, for example via a ML model that is trained to identify bias prone features in datasets. In some implementations, in addition to identifying the feature, a desired distribution of values for the identified features may also be identified. The desired distribution of values may also be supplied by the model creator, determined by the user, or identified by the bias detection and validation application or service. Once the feature and its desired distribution are identified, the dataset may be examined for bias in the feature and the results may be displayed in a visualization interface to enable the user to quickly identify gaps in data that point to bias.

Figure 4B:
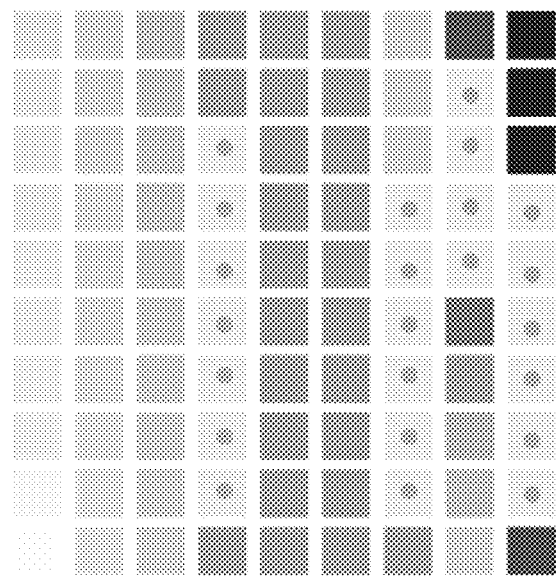
FIG. 4B depicts an example method of visualizing bias in a dataset.

FIG. 4B depicts an example method of visualizing imbalance distribution of data in a dataset such as the dataset 400A of FIG. 4A. When bias detection is performed based on a skin tone feature on a dataset such as dataset 400A, the results of the bias examination may be visualized for the user's easy reference in a skin tone map 400B. The skin tone map 400B may display a colored box (with a color corresponding to the represented the skin tone) for each skin tone for which the dataset includes a distribution above a predetermined threshold, while displaying a box with a dot for all skin tones for which a distribution above the predetermined threshold is not present in the dataset. This can enable a person to determine quickly what skin tones are not fairly represented in the dataset. For example, the skin tone map 400B may show that quite a few darker skin tones are not represented adequately in the dataset indicating that the dataset as a whole is skewed toward lighter skin tones. To present the skin tone map 400B, the bias detection system may include or have access to a directory of possible skin tones. Alternatively, the possible skin tones may be provided to the bias detection system as an input, for example by the model creator.

Figure 5A:
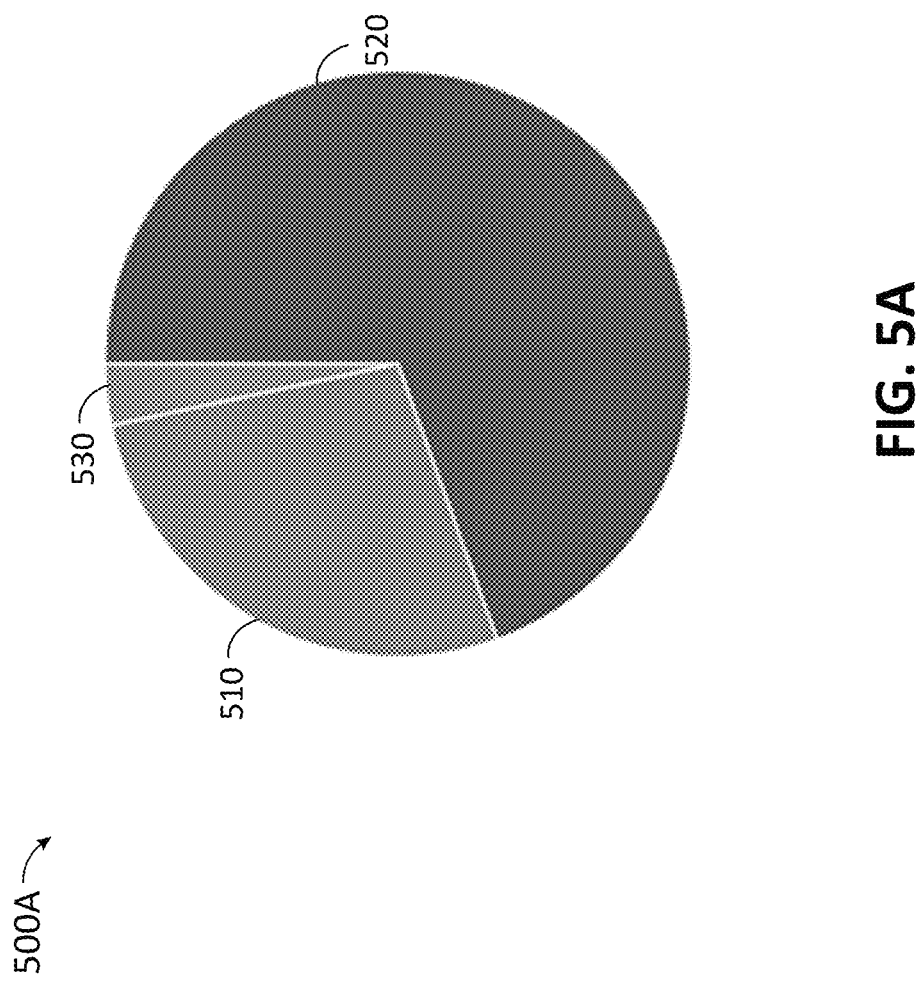
FIGS. 5A-5B depict more example methods of visualizing bias in a dataset.
Figure 5B:
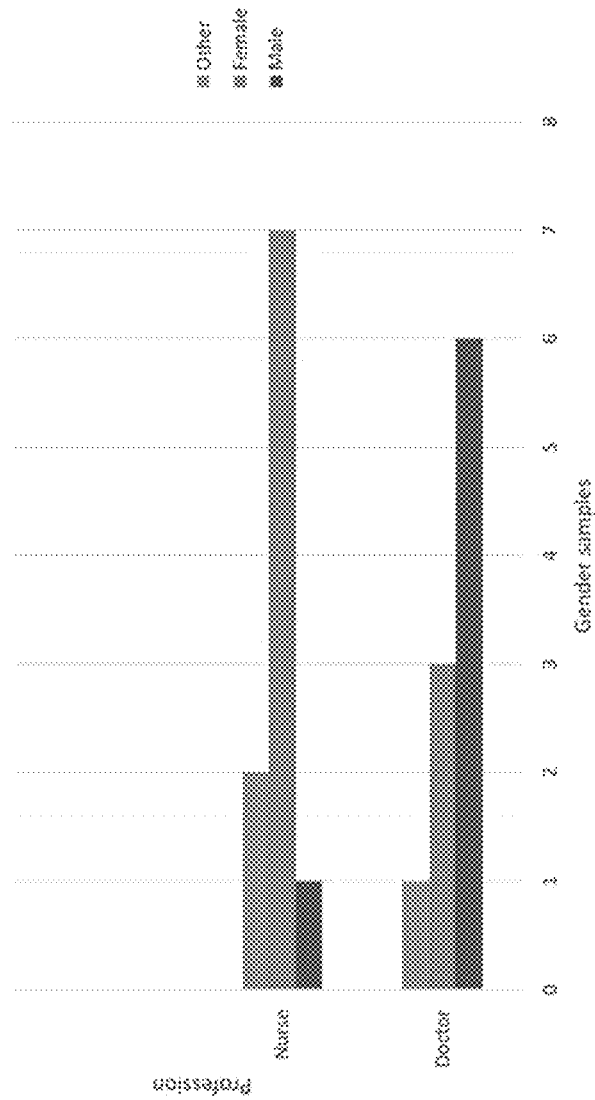

FIGS. 5A-5B depict alternative interfaces for visualizing bias in a dataset. FIG. 5A depicts an example pie chart 500A for displaying feature distribution of data in a dataset. For a bias detection process in which the dataset was examined based on the feature of gender, the pie chart 500A may display percentage of each of the categories for the gender feature. For example, portion 520 of the pie chart 500A may represent percentage of male datapoints in the dataset, while portion 510 may represent percentage of female datapoints and portion 530 may represent percentage of non-binary datapoints. In one implementation, each of the three portions may be displayed in a different color for easy distinction. A quick glance at the pie chart 500A can reveal that this dataset is heavily imbalanced with respect to gender. A user viewing the dataset may then decide whether the imbalance points to gender bias.

FIG. 5B depicts an alternative visualization interface 500B for displaying feature bias in a dataset. Visualization interface 500B displays a clustered chart for distribution of data in two correlated features. This may be useful as sometimes the importance of one piece of data is revealed more clearly when compared to a second one. Thus, the data imbalance detection and validation system could cross-reference data of different features to examine distributions across the correlated features. For example, as shown in FIG. 5B gender and profession features can be correlated to identify the distribution of gender in each profession.

By visualizing the resulting distribution in a clustered chart, the user can quickly determine that the dataset includes too many male doctors and too few male nurses. Cross referencing can be used in a variety of other combination of features. For example, zip codes may be correlated with skin tone to determine if a fair distribution of skin tones is provided across each zip code. To determine fairness, the distribution of skin tone in a zip code may be compared with data representative of the real population of the zip code to identify if they correspond. For example, if census data shows that a zip code has a 10% African American population, while the distribution of dark skin tone in the zip code in the dataset is only 3%, the dataset may not provide a fair distribution of dark skin tones in that zip code and thus may point to bias.

While FIGS. 5A-5B display a pie chart and a clustered chart, many more types of charts and reports may be used to visualize detected bias. In one implementation, the type of visualization interface used to visualize the distribution in one or more features may be selected by the user. For example, the bias detection tool may provide an option for the user to choose how to view the results. Options may include a written report, a variety of charts such as scatter chart, a clustered column chart, a clustered bar chart, a line chart, a stacked column chart, a stacked bar chart, a pie chart, and a distribution map such as a skin tone map. Alternatively, the type of visualization interface used may depend on the underlying application within which the bias detection and validation mechanism is provided and/or may be selected by the bias detection and validation system based on one or more parameters such as the type of feature for which distribution is being shown. For example, for a feature such as gender which only includes three categories, a stacked column chart may be used, while for a feature such as skin tone, a skin tone map may be utilized. Thus, in one implementation, the bias detection and validation system can choose the type of visualization interface used based on predetermined or learned parameters. In an example, the type of visualization interface used may be changeable by the user. For example, if the pie chart 500A of FIG. 5A is used to display the distribution of gender, the user may decide that a stacked column chart better shows the results and can choose to change the visualization interface to the stacked column chart from a user interface of the application or service providing the bias detection and validation mechanism.

Figure 6A:
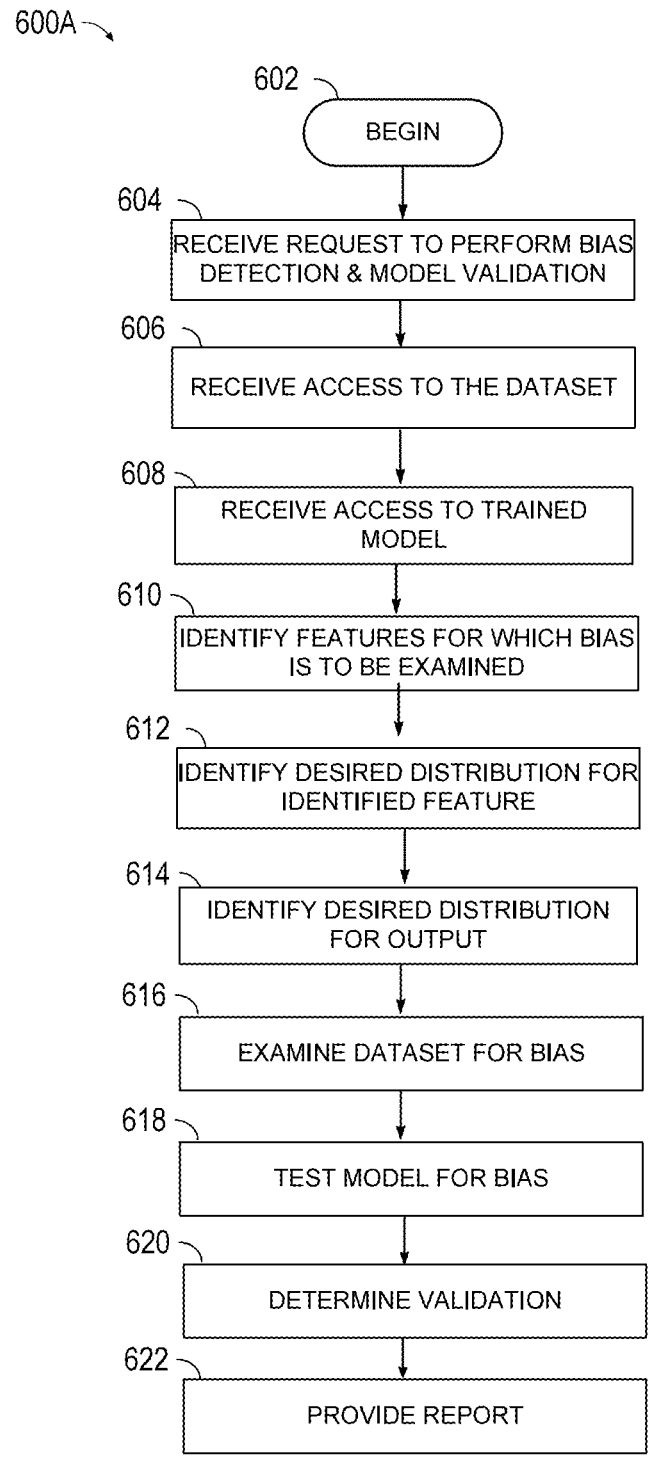
FIGS. 6A-6B are flow diagrams depicting example methods for providing data imbalance detection and validation for a trained ML model.

FIG. 6A is a flow diagram depicting an example method 600A for providing data imbalance detection and validation for a trained a ML model. The method 600A may begin, at 602, and proceed to receive a request to perform a data imbalance detection and validation operation, at 604. The request may be received via a user interface of an application or service that provides a data imbalance detection and validation. For example, it may be received via a menu button of a user interface associated with the data imbalance detection and validation service. This may be done, by a user after receiving a request from a model creator/developer or an entity that submits a model for validation.

Once a request for performing data imbalance detection and validation is received, method 600A may receive access to the dataset that was used to train the model, at 606. This may be achieved by the submitter (e.g., model creator/developer or entity that submitted a model for validation) making the dataset available to the entity that runs the data imbalance detection and validation service. For example, access to the database may be provided via a network. Alternatively, a copy of the dataset may be provided to the entity that runs the data imbalance detection and validation service. In either case, once the entity that runs the data imbalance detection and validation service has access to the database, a pointer to the database may be submitted to the data imbalance detection and validation service to enable the service to identify the database and gain access to it. This may be done via a user interface element that enables the user to identify the dataset for performing data imbalance detection. For example, a user interface allowing the user to browse to a desired dataset may be presented to the user as part of the data imbalance detection process. In one implementation, the user may be able to select the entire dataset or a subset of it. For example, the user may be able to select the training and validation subsets of data for a dataset for which those subsets are provided. Alternatively, when a dataset is selected for performing data imbalance detection, any identified subsets of the dataset may automatically be examined for data imbalance.

After receiving access to the dataset, method 600A may receive access to the trained model, at 608. This may be done by receiving an access point to the trained model. For example, the model submitter may provide an access point to the trained model to the entity that runs the data imbalance detection and validation service, and the user may identify in a user interface how the data imbalance detection and validation service can gain access to the access point.

Once access to the dataset and the trained model is gained, method 600A may proceed to identify one or more features of the dataset for which bias and/or data imbalance should be examined, at 610. In one implementation, the one or more features may be selected by a user. For example, the data imbalance detection and validation service may provide a user interface for choosing features of the dataset for which bias and/or data imbalance will be checked. This may be presented as a list of options (based on available features of the dataset) for the user to choose from. Alternatively, the user may enter (e.g., by typing the name of the feature, or by clicking on a column heading of the dataset for a column displaying a desired feature, and the like) the desired feature(s) in a user interface element. In an example, the user may specify two or more features for which cross-correlation is desired. The features may be identified by the user on their own and they may receive this information from the model submitter. For example, the model submitter having more knowledge of the trained model may identify during the submission process what features are important to examine for bias and/or data imbalance.

Alternatively, the data imbalance detection and validation service may itself identify features for which bias and/or data imbalance should be examined. For example, the data imbalance detection and validation service may use a trained ML model to identify features in trained models that commonly exhibit or cause bias and may automatically select those from the dataset depending on the content of the dataset and/or the objectives and functionalities of the trained model that is being validated.

It should be noted that features for which data imbalance correction is performed may not be actual fields in the dataset. In an example, a balanceable feature may be a feature that the ML model derives by itself. For example, the initial dataset may have patient locations and air mile distances to the local hospital. During training, the ML model may derive a feature such as transit time to the local hospital that is not explicit in the original dataset based on the patient locations and air mile distances to the local hospital. Such features may be presentable and detectable as well, as typically a modeler can get numeric feature values for the ML model derived features for a given input record.

After identifying the features, method 600A may identify a desired distribution for each of the identified features for determining whether the data is balanced, at 612. Similar to the identification of the features, this may be achieved via a user interface of the data imbalance detection and validation system based on individual or entity knowledge or standards or based on information received from the submitter. In another example, the desired distribution may be determined automatically by the data imbalance detection and validation system by for example utilizing a trained ML model. For example, the bias detection tool may examine the dataset and determine if the dataset includes any features in a list of common features that are known to have ethical implications if the data distribution is not balanced. For example, the common features may include gender, race, sexual orientation, and age. In an example, the bias detection tool may examine the contents of the dataset and/or the type of ML model for which the dataset may be used to determine what feature(s) may be most appropriate for identifying bias. For example, race may be a more important feature to examine in a dataset that may be used to determine a ML learning used in crime detection to ensure the dataset is balanced and unbiased with respect to race. The determination of what features to use for examining bias may be made based on multiple parameters that may be stored in a database accessible to the bias detection and validation system.

In addition to identifying the feature(s), the user may also specify a desired threshold for determining whether the data is balanced to within the desired threshold for each feature. The desired threshold may be the same or it may be different for each identified feature. Again, the desired threshold may be identified by the user, submitted by the model submitter or identified by the system.

In addition to identifying features and their desired distribution, method 600A may also identify a desired distribution for output, at 614. This may be achieved via a user interface of the data imbalance detection and validation system based on individual or entity knowledge or standards or based on information received from the submitter. In another example, the desired distribution of the output may be determined automatically by the data imbalance detection and validation system by for example utilizing a trained ML model. In situations where the data imbalance detection and validation system provides a validation certificate, it may be more important for the system or the user of the system to determine the desire distribution in the output. However, this may need to be done with knowledge of the functionalities of the trained model. For example, it may be difficult for a trained model for loan approval to completely avoid some bias in outcome between males and females because of associations female with lower incomes. Completely eliminating this bias may result in a model that ignores more default rates associated with lower incomes. The degree to which this association can be taken into account while reducing discrimination may need to be determined on case by case basis.

Once the require information is received, method 600A may proceed to access the dataset(s) and examine them to identify bias and/or data imbalance, at 616. This may include performing statistical analysis of the data to categorize and identify a distribution across multiple categories. For example, for a dataset for which the feature gender is being examined, method 600A may determine the number of datapoints corresponding to the each of the categories available for gender (e.g., male, female, and non-binary). The number of each category may then be compared to the total number of datapoints to calculate a percentage of the datapoints representing each category. Other features may require more complex analysis. For example, to determine distribution of skin tone in a dataset comprised of facial images, the images may first need to be processed to extract the skin tone information from them. Then based on the extracted information, the number of categories available for skin tone may be identified before the number of datapoints in each category can be calculated. In one implementation, a machine leaning model may be used in performing statistical analysis of the dataset to categorize and identify bias and/or data imbalance. In one implementation, the identified distribution is examined to determine whether the feature is balanced within the desired threshold. The threshold may be provided by the user or determined by the bias detection and validation system.

Examining for bias and/or imbalanced data may also include identifying feature values that stand out as uncharacteristic or unusual as these values could indicated problems that occurred during data collection. In one implementation, any indication that certain groups or characteristics may be under or overrepresented relative to their real-world prevalence can point to bias or imbalance in data.

In addition to examining the dataset for bias, method 600A may also assess the trained model for bias and/or data imbalance, at 618. This may be done by executing the trained model with validation data from the dataset to determine if the outcome generated by the model corresponds with the desired distribution for outcome. For example, the distribution of the outcome may be compared with the desired distribution to determine if they are within a predetermined threshold. Depending on the result of this analysis, method 600A may determination a validation status for the trained model, at 620. For example, method 600A may identify the trained model as validated for bias or it may determine that the trained model exhibits too much bias to be validate. In either case, method 600A may proceed to provide a report of the analysis to the user, at 622.

This may be done by providing a report identifying whether the database exhibits any bias, for example, by identifying if the distribution of the feature(s) across various categories is balanced within a certain threshold. The report may also identify whether the trained model generates a biased outcome. In an example, the report may include a visualization interface that visualizes the distribution to make it easier to notice bias. For example, as discussed above, various types of charts may be used to visualize the distribution.

Figure 6B:
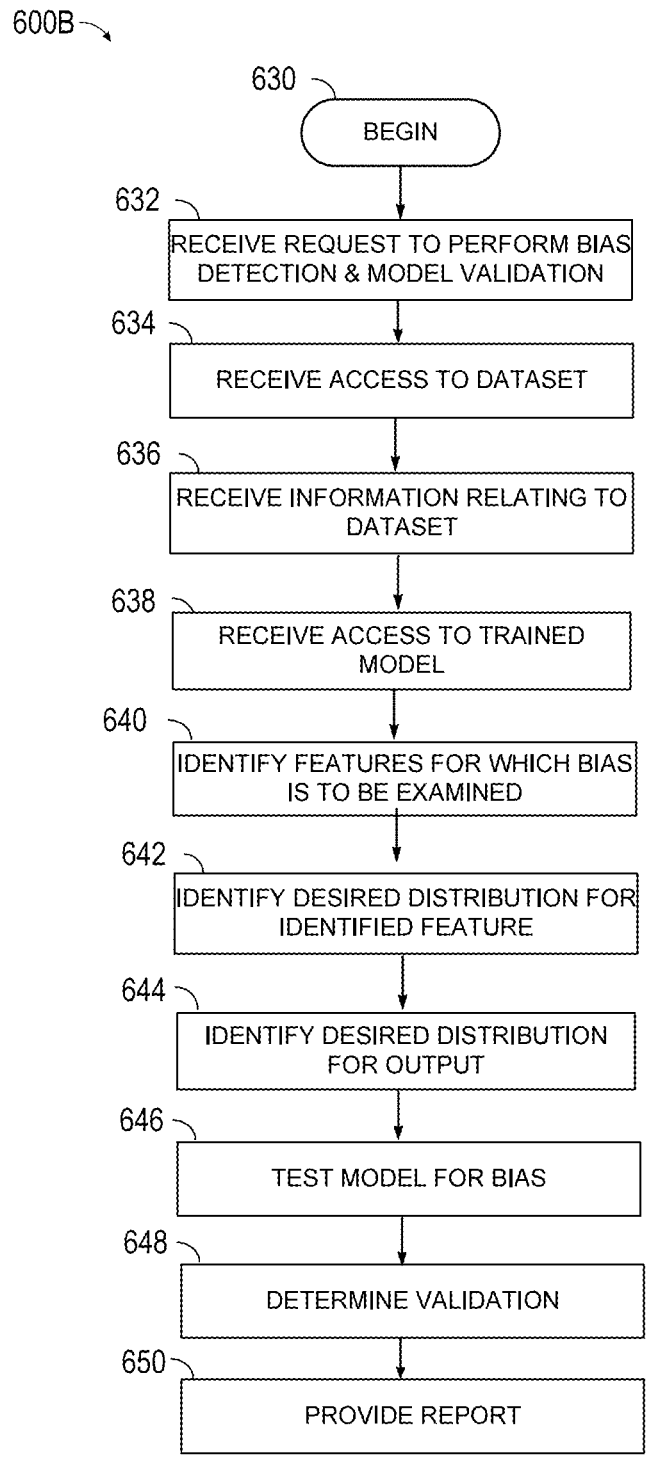

FIG. 6B is a flow diagram depicting an alternative example method 600B for providing data imbalance detection and validation for a trained a ML model. Method 600B may begin, at 630, and proceed to receive a request to perform a data imbalance detection and validation operation, at 632. The request may be received via a user interface of an application or service that provides a data imbalance detection and validation. For example, it may be received via a menu button of a user interface associated with the data imbalance detection and validation service. This may be done, by a user after receiving a request from a model creator/developer or an entity that submits a model for validation.

Once a request for performing data imbalance detection and validation is received, method 600B may receive information about the dataset that was used to train the model, at 634. For example, metadata relating to the features of the dataset may be provided to the method 600B. This is because instead of utilizing the same database that was used to train the model, method 600B uses a different dataset. The different dataset may be an existing dataset or a newly generated dataset for example developed specifically for validating the trained model. The new dataset may be provided by the entity that performs the data imbalance detection and validation service. This may be done to ensure that any bias available in the original dataset is not replicated during the validation. By using a different dataset, the data imbalance detection and validation service can provide a more objective analysis and determination. In one implementation, the different dataset has already been examined for bias and any identified bias has been eliminated or reduced. In one implementation, in order to generate a different dataset for testing, the submitter may specify important features and their desired distribution, along with a desired distribution for the outcomes.

After receiving a request to perform data imbalance detection and validation, method 600B may proceed to receive access to the dataset for validation the mode. This may be achieved by providing a pointer to the database to enable the service to identify the database and gain access to it. This may be done via a user interface element that enables the user to identify the dataset for performing bias detection. For example, a user interface allowing the user to browse to a desired dataset may be presented to the user as part of the bias detection process. In one implementation, the user may be able to select the entire dataset or a subset of it. For example, the user may be able to select the training and validation subsets of data for a dataset for which those subsets are provided.

After receiving access to the dataset, method 600B may receive access to the trained model, at 636. This may be done by receiving an access point to the trained model. For example, the model submitter may provide an access point to the trained model to the entity that runs the bias detection and validation service, and the user may identify in a user interface how the data imbalance detection and validation service can gain access to the access point.

Once access to the dataset and the trained model is gained, method 600B may proceed to identify one or more features of the dataset for which bias and/or data imbalance should be examined, at 638. In one implementation, the one or more features may be selected by a user. For example, the data imbalance detection and validation service may provide a user interface for choosing features of the dataset for which bias and/or data imbalance will be checked. This may be presented as a list of options (based on available features of the dataset) for the user to choose from. Alternatively, the user may enter (e.g., by typing the name of the feature, or by clicking on a column heading of the dataset for a column displaying a desired feature, and the like) the desired feature(s) in a user interface element. In an example, the user may specify two or more features for which cross-correlation is desired. The features may be identified by the user on their own and they may receive this information from the model submitter. For example, the model submitter having more knowledge of the trained model may identify during the submission process what features are important to examine for bias and/or data imbalance. Alternatively, the data imbalance detection and validation service may itself identify features for which bias and/or data imbalance should be examined. For example, the data imbalance detection and validation service may use a trained ML model to identify features in trained models that commonly exhibit or cause bias and may automatically select those from the dataset depending on the content of the dataset and/or the objectives and functionalities of the trained model that is being validated.

After identifying the features, method 600B may identify a desired distribution for each of the identified features for determining whether the data is balanced, at 642. Similar to the identification of the features, this may be achieved via a user interface of the data imbalance detection and validation system based on individual or entity knowledge or standards or based on information received from the submitter. In another example, the desired distribution may be determined automatically by the data imbalance detection and validation system by for example utilizing a trained ML model. For example, the bias detection tool may examine the dataset and determine if the dataset includes any features in a list of common features that are known to have ethical implications if the data distribution is not balanced. The common features may include gender, race, sexual orientation, and age. In an example, the bias detection tool may examine the contents of the dataset and/or the type of ML model for which the dataset may be used to determine what feature(s) may be most appropriate for identifying bias. For example, race may be a more important feature to examine in a dataset that may be used to determine a ML learning used in crime detection to ensure the dataset is balanced and unbiased with respect to race. The determination of what features to use for examining bias may be made based on multiple parameters that may be stored in a database accessible to the bias detection and validation system.

In addition to identifying the feature(s), the user may also specify a desired threshold for determining whether the data is balanced to within the desired threshold for each feature. The desired threshold may be the same or it may be different for each identified feature. Again, the desired threshold may be identified by the user, submitted by the model submitter or identified by the system.

In addition to identifying features and their desired distribution, method 600B may also identify a desired distribution for output, at 644. This may be achieved via a user interface of the data imbalance detection and validation system based on individual or entity knowledge or standards or based on information received from the submitter. In another example, the desired distribution of the output may be determined automatically by the data imbalance detection and validation system by for example utilizing a trained ML model.

Once the require information is received, method 600B may proceed to assess the trained model for bias and/or data imbalance, at 646, by using the different dataset as a validation dataset. This may be done by executing the trained model with validation data from the different dataset to determine if the outcome generated by the model corresponds with the desired distribution for outcome. For example, the distribution of the outcome may be compared with the desired distribution to determine if they are within a predetermined threshold. Depending on the result of this analysis, method 600B may determination a validation status for the trained model, at 648. For example, method 600B may identify the trained model as validated for bias or it may determine that the trained model exhibits too much bias to be validate. In either case, method 600B may proceed to provide a report of the analysis to the user, at 650, as discussed above.

It should be noted that the data imbalance detection and validation system may be hosted locally on a client computer or remotely in the cloud (e.g., data imbalance detection and validation service). In one implementation, a local bias detection engine is hosted locally, while others are stored in the cloud. This enables the client device to provide some bias detection and validation operations even when the client is not connected to a network. Once the client connects to the network, however, the application may be able to provide better and more complete bias detection and validation.

Thus, methods and systems for providing a third-party data imbalance detection and validation mechanism associated with trained ML model are disclosed. By detecting and validation the trained model via an objective third-party, some forms of bias that may need be detected by model creators may be identified. Additionally, the process of data imbalance detection and validation can become more standardized creating a more robust way of ensuring trained ML models comply with ethical, fairness, regulatory and policy standards.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as client devices, native application provider, web servers, server clusters, external services, and other servers. A representative hardware layer 704 includes a processing unit 706 and associated executable instructions 708. The executable instructions 708 represent executable instructions of the software architecture 702, including implementation of the methods, modules and so forth described herein.

The hardware layer 704 also includes a memory/storage 710, which also includes the executable instructions 708 and accompanying data. The hardware layer 704 may also include other hardware modules 712. Instructions 708 held by processing unit 708 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various GUI functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 720 may include, but are not limited to, a contacts application, a browser application, a location application, a media application, a messaging application, and/or a game application. Third-party applications 742 may include any applications developed by an entity other than the vendor of the particular system. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 728 such as an OS 750, libraries 752, frameworks 754, applications 756, and/or a presentation layer 758.

Figure 8:
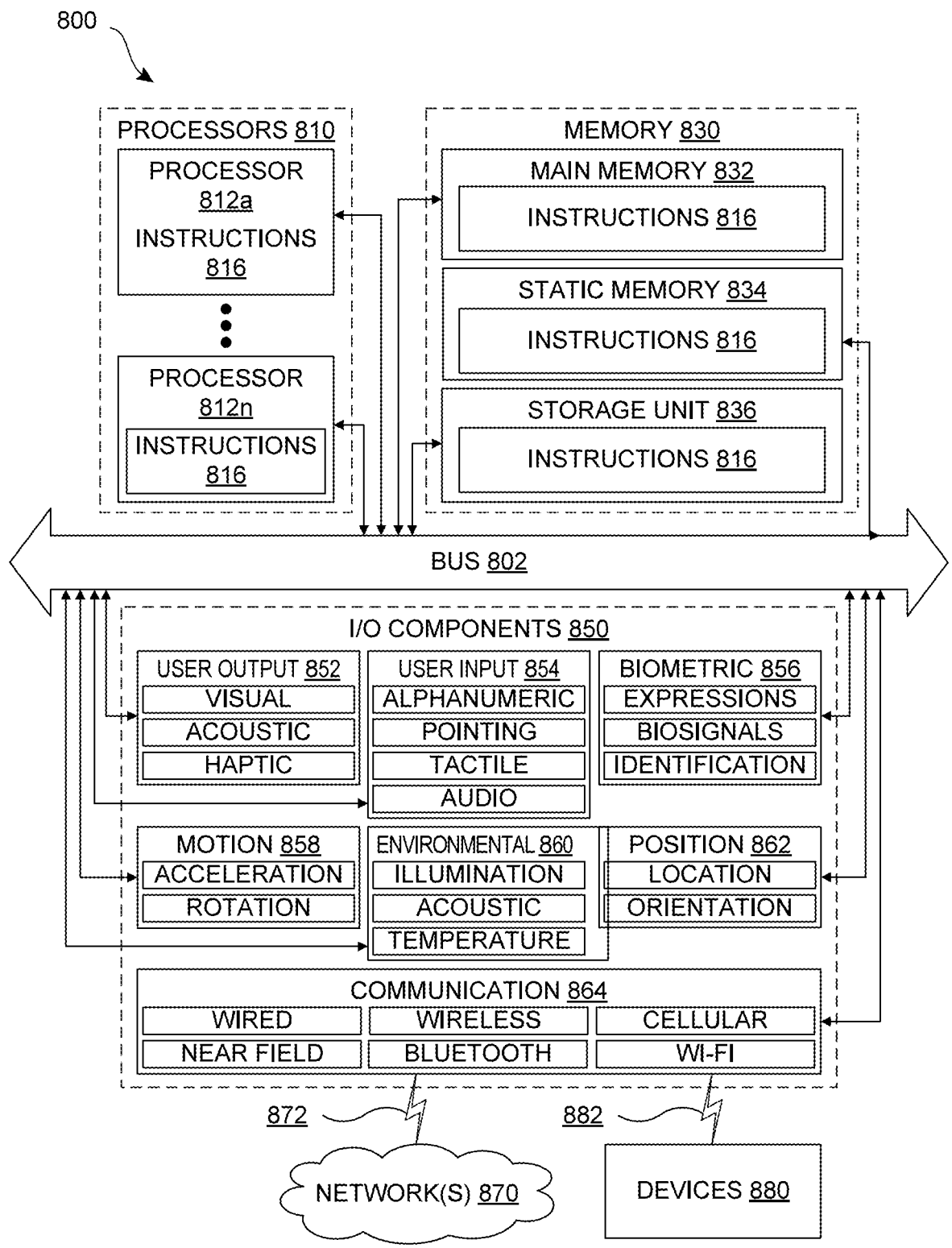
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement methods or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" include a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 916 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860 and/or position components 862, among a wide array of other environmental sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by the processor cause the data processing system to perform functions of:
   receiving a request to perform data imbalance detection on a trained machine-learning (ML) model;
   providing, as an input, a dataset associated with the trained model to a trained feature identifier ML model for automatically identifying a feature for which data imbalance detection is to be performed, the trained feature identifier ML model being trained for automatically identifying the feature based on a content of the dataset and an objective of the trained ML model;
   receiving the feature as an output of the trained feature identifier ML model;
   receiving access to the dataset;
   receiving access to the trained ML model;
   automatically determining a desired distribution threshold for the feature;
   examining at least one of the dataset or outcome data generated by the trained ML model to calculate a distribution of the feature in the dataset or a distribution of the feature in the outcome data;
   comparing the calculated distribution with the desired distribution threshold;
   determining that the trained ML model exhibits data imbalance when the calculated distribution is outside a range of the desired distribution threshold, and
   providing a report of the data imbalance,
   wherein:
   the dataset is different from an original dataset that was used to train the trained ML model,
   examining the dataset to calculate a distribution of the feature includes performing a statistical analysis on the dataset to determine a percentage distribution of the feature across one or more categories available for the feature.

2. The data processing system of claim 1, wherein examining the outcome data generated by the trained model includes running the trained ML model with the dataset as input to generate the outcome data.

3. The data processing system of claim 1, wherein the executable instructions when executed by the processor further cause the data processing system to provide a report identifying that the trained ML model is validated for being low-biased or unbiased, when the calculated distribution is within the range of the desired distribution threshold.

4. A method for providing data imbalance detection and validation for a trained machine-learning (ML) model, the method comprising:
 receiving a request to perform data imbalance detection on the trained ML model;
 providing, as an input, a dataset associated with the trained model to a trained feature identifier ML model for automatically identifying a feature for which data imbalance detection is to be performed, the trained feature identifier ML model being trained for automatically identifying the feature based on a content of the dataset and an objective of the trained ML model;
 receiving the feature as an output of the trained feature identifier ML model;
 receiving access to the dataset;
 receiving access to the trained ML model;
 automatically determining a desired distribution threshold for the feature;
 examining at least one of the dataset or outcome data generated by the trained ML model to calculate a distribution of the feature in the dataset or a distribution of the feature in the outcome data;
 comparing the calculated distribution with the desired distribution threshold; and
 determining that the trained ML model exhibits data imbalance when the calculated distribution is outside a range of the desired distribution threshold, and
 providing a report of the data imbalance,
 wherein:
  the dataset is different from an original dataset that was used to train the trained ML model,
  examining the dataset to calculate a distribution of the feature includes performing a statistical analysis on the dataset to determine a percentage distribution of the feature across one or more categories available for the feature.

5. The method of claim 4, wherein examining the outcome data generated by the trained model includes running the trained ML model with the dataset as input to generate the outcome data.

6. The method of claim 4, further comprising providing a report identifying that the trained ML model is validated for being low-biased or unbiased, when the calculated distribution is within the range of the desired distribution threshold.

7. A non-transitory computer readable medium on which are stored instructions that, when executed cause a programmable device to:
 receive a request to perform data imbalance detection on a trained machine-learning (ML) model;
 provide, as an input, a dataset associated with the trained model to a trained feature identifier ML model for automatically identifying a feature for which data imbalance detection is to be performed, the trained feature identifier ML model being trained for automatically identifying the feature based on a content of the dataset and an objective of the trained ML model;
 receive the feature as an output of the trained feature identifier ML model;
 receive access to the dataset;
 receive access to the trained ML model;
 automatically determine a desired distribution threshold for the feature;
 examine at least one of the dataset or outcome data generated by the trained ML model to calculate a distribution of the feature in the dataset or a distribution of the feature in the outcome data;
 compare the calculated distribution with the desired distribution threshold; and
 determine that the trained ML model exhibits data imbalance when the calculated distribution is outside a range of the desired distribution threshold, and
 provide a report of the data imbalance,
 wherein:
  the dataset is different from an original dataset that was used to train the trained ML model,
  examining the dataset to calculate a distribution of the feature includes performing a statistical analysis on the dataset to determine a percentage distribution of the feature across one or more categories available for the feature.

8. The non-transitory computer readable medium of claim 7, wherein examining the outcome data generated by the trained model includes running the trained ML model with the dataset as input to generate the outcome data.

9. The non-transitory computer readable medium of claim 7, wherein the stored instructions when executed further cause a programmable device to provide a report identifying that the trained ML model is validated for being low-biased or unbiased, when the calculated distribution is within the range of the desired distribution threshold.

* * * * *